US012570549B2

(12) United States Patent
Nancrede

(10) Patent No.: US 12,570,549 B2
(45) Date of Patent: Mar. 10, 2026

(54) MULTI-SEQUENCE WATER SOFTENER SYSTEM AND METHOD

(71) Applicant: Christopher Nancrede, Indianapolis, IN (US)

(72) Inventor: Christopher Nancrede, Indianapolis, IN (US)

( * ) Notice: Subject to any disclaimer, the term of this patent is extended or adjusted under 35 U.S.C. 154(b) by 0 days.

(21) Appl. No.: 18/384,748

(22) Filed: Oct. 27, 2023

(65) Prior Publication Data

US 2024/0076208 A1 Mar. 7, 2024

Related U.S. Application Data

(62) Division of application No. 17/163,389, filed on Jan. 30, 2021, now Pat. No. 11,820,677.

(60) Provisional application No. 62/968,133, filed on Jan. 30, 2020.

(51) Int. Cl.
*C02F 1/42* (2023.01)
*B01D 15/18* (2006.01)
*B01D 15/20* (2006.01)
*C02F 1/00* (2023.01)

(52) U.S. Cl.
CPC ............ *C02F 1/42* (2013.01); *B01D 15/1871* (2013.01); *B01D 15/1885* (2013.01); *B01D 15/203* (2013.01); *C02F 1/008* (2013.01); *C02F 2001/425* (2013.01); *C02F 2209/05* (2013.01); *C02F 2209/40* (2013.01); *C02F 2303/16* (2013.01)

(58) Field of Classification Search
CPC .. C02F 1/42; C02F 2303/16; C02F 2209/005; C02F 2001/422; C02F 2001/425; C02F 2001/427; B01D 15/1871; B01J 49/85; B01J 49/75
See application file for complete search history.

(56) References Cited

U.S. PATENT DOCUMENTS

| | | | | | |
|---|---|---|---|---|---|
| 3,154,484 | A | * | 10/1964 | Stoner | B01J 49/75 210/126 |
| 2002/0149489 | A1 | * | 10/2002 | Bearak | C02F 1/42 340/572.1 |
| 2005/0103723 | A1 | * | 5/2005 | Wilkins | B01D 61/54 204/524 |

FOREIGN PATENT DOCUMENTS

| | | | | | |
|---|---|---|---|---|---|
| CA | 2665355 | A1 | * | 11/2010 | C02F 9/00 |
| DE | 10350884 | A1 | * | 6/2005 | B01J 49/0095 |
| JP | 2015226910 | A | * | 12/2015 | |

OTHER PUBLICATIONS

Machine generated translation of JP-2015226910-A (Year: 2015).*
Machine generated translation of DE-10350884-A1 (Year: 2005).*

* cited by examiner

*Primary Examiner* — Magali P Slawski
*Assistant Examiner* — Bernadette Karen Mcgann
(74) *Attorney, Agent, or Firm* — Bradshaw Law LLC

(57) ABSTRACT

A multi tank water softener system and method in which multiple softeners can be selectively operated in parallel, alternating, or in series in either order. The system reduces risk of legionella and pathogen growth while also reducing salt usage by up to 40%.

8 Claims, 2 Drawing Sheets

MULTI-SEQUENCE WATER SOFTENER SYSTEM AND METHOD

CROSS-REFERENCE TO RELATED APPLICATIONS

This application is a Divisional of application Ser. No. 17/163,389, filed Jan. 30, 2021, which claims the benefit of Provisional Application Ser. No. 62/968,133 filed Jan. 30, 2020, the disclosures of which are hereby incorporated by reference.

FEDERALLY SPONSORED RESEARCH OR DEVELOPMENT

None.

TECHNICAL FIELD

The present invention relates to multi-unit water softening systems. More specifically, but not exclusively, the present invention relates to a multi-unit water softening system that allows for series operation of softeners where the order of the units can be switched. In other words, during one mode of operation, the effluent from softener A may be input to softener B, and during another mode of operation, the effluent from softener B may be input to softener A.

BACKGROUND

Various ion-exchange based water softener systems are known in the art, such as U.S. Pat. No. 3,312,617 to Klein; US 2006/0169641 to Duke et al.; U.S. Pat. No. 3,351,550 to Kraiker; US 2002/0179533 to Chen; U.S. Pat. No. 8,608,963 to Stewart et al.; US 2008/0035578 to Powers; U.S. Pat. No. 6,776,913 to Jangbarwala; U.S. Pat. No. 7,261,819 to Jordan et al.; U.S. Pat. No. 6,036,866 to Zimmerman et al.; U.S. Pat. No. 4,764,280 to Brown et al.; U.S. Pat. No. 5,300,230 to Brane et al.; U.S. Pat. No. 5,073,255 to Chili et al.; and U.S. Pat. No. 4,104,165 to Braswell, the disclosures of which are hereby incorporated by reference.

Most multi-unit commercial and industrial water softener systems operate in alternating mode wherein one softener (or ion exchange vessel) is online (or in service) and the other softener (or softeners) are offline. When the first softener runs out of softening capacity, it goes into regeneration (i.e. is flushed with a brine solution) and the other softener comes online into the service position. When this second unit comes online, it may have been offline for several hours or days. With extended periods of non-use of a component, bacterial levels are typically elevated, increasing risks of legionella and other dangerous pathogen (disease causing organism) growth. This is exacerbated with triple or quad (or more) softener tank setups. The problem of Legionella growth is particularly acute when water softeners are kept in boiler or mechanical rooms where temperatures are high, as those higher temperatures tend to foster Legionella growth.

SUMMARY

The present invention provides novel water softening systems and techniques. While the actual nature of the invention covered herein can only be determined with reference to the claims appended hereto, certain aspects of the invention that are characteristic of the embodiments disclosed herein are described briefly as follows.

In one form, the invention provides a water softening system comprising first and second ion exchange water softening units that are operably connected by controlled valves and conduits such that the first and second units are selectively operable in series in either order. Thus, during a first softening mode of operation, the water being softened flows through the first unit and then through the second unit, and during a second softening mode of operation, the water being softened flows through the second unit and then through the first unit. Operating the units in series provides more efficient and effective softening, and by periodically alternating the sequence of the units (i.e. switching the lead and lag units, respectively) a sufficiently frequent regeneration schedule for each unit may be employed such that the potential for unwanted pathogen growth in the regeneration components can be reduced. The units may be further operable in a third softening mode of operation in which the water being softened flows through the first and second ion exchange water softening units in a parallel fashion. This third mode can be used to provide increased throughput when there is a high demand for softened water. The softeners can also be operated in a conventional alternating mode, with one unit online at a time.

When water softeners are operated in series, the lead softener that receives the raw feedwater is referred to as the worker, and the lag softener that received the partially softened water from the worker is referred to as the polisher. Using both softeners together in a worker/polisher arrangement allows for better performance and higher efficiency. A worker/polisher arrangement can utilize lower salting rates, while still reducing hardness leakage. The softener system can offer water quality near zero hardness using up to 40% less salt. A worker/polisher arrangement also provides redundancy in that, if one tank fails to regenerate properly, the other tank would still soften the water.

In another form, the invention provides an early warning system for possible regeneration failure of an ion exchange water softening unit. The early warning system comprises a brine flow meter that measures the amount of brine solution that is provided to a softener over time during its regeneration cycle, and a controller that generates a warning signal of a potential regeneration failure when the measured amount is below a predetermined value for a set amount of time.

In another form, the invention provides an improved method of sanitizing a water softener. In this form, the water softening system includes a recirculation loop and pump for selectively circulating a sanitizing solution through one or more of the ion exchange water softening units during a sanitization process.

Additional aspects, alternatives and variations as would be apparent to persons of skill in the art are also disclosed herein and are specifically contemplated as included as part of the invention.

BRIEF DESCRIPTION OF THE DRAWINGS

Although the characteristic features of this invention will be particularly pointed out in the claims, the invention itself, and the manner in which it may be made and used, may be better understood by referring to the following description taken in connection with the accompanying figures forming a part thereof.

DESCRIPTION OF EXAMPLE EMBODIMENTS

Reference is made herein to some specific examples of the present invention, including any best modes contemplated by the inventor for carrying out the invention. While the invention is described in conjunction with these specific embodiments, it will be understood that it is not intended to limit the invention to the described or illustrated embodiments. To the contrary, it is intended to cover alternatives, modifications, and equivalents as may be included within the spirit and scope of the invention as defined by the appended claims.

Figure 1:
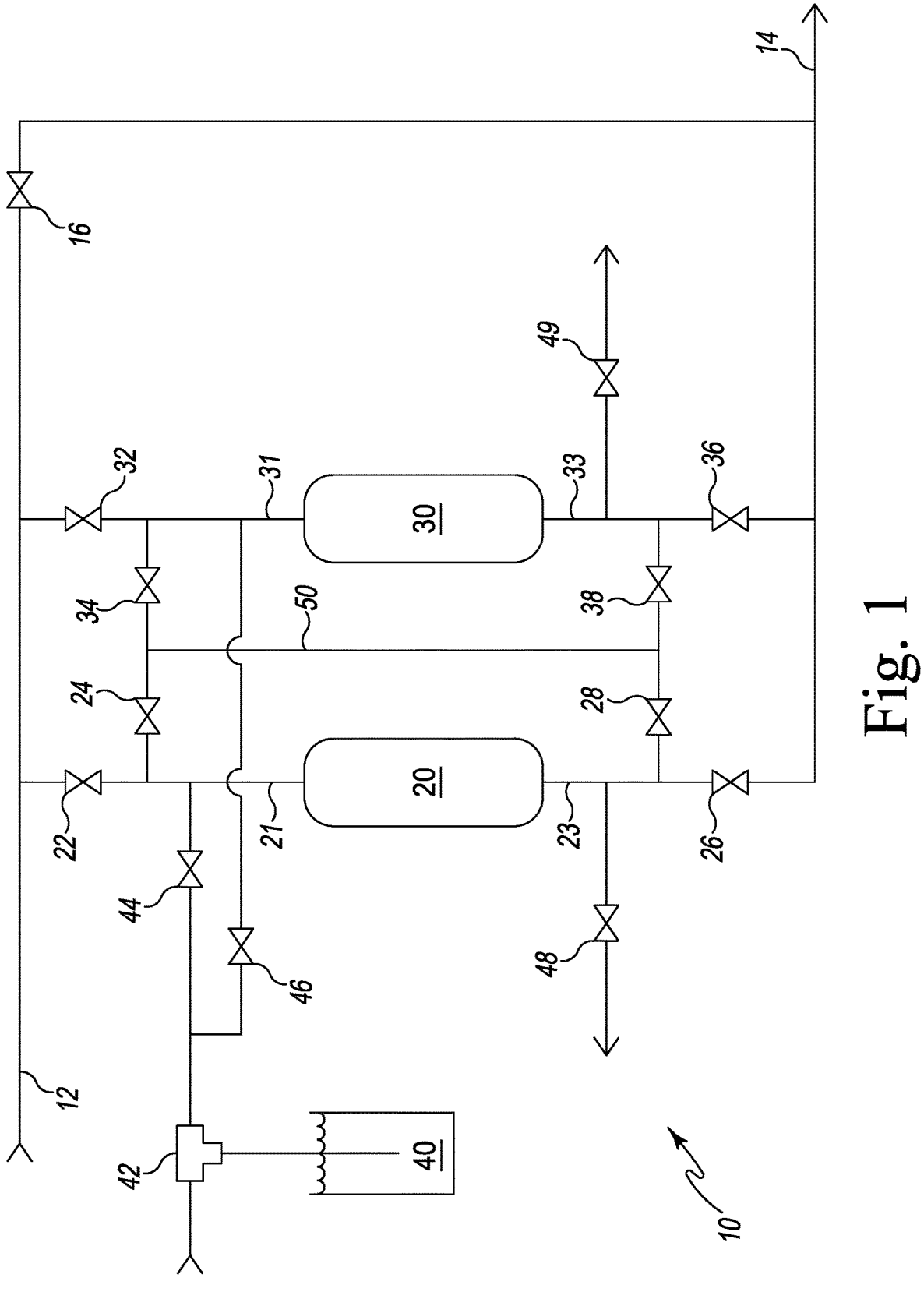
FIG. 1 is a diagrammatic flow sheet of a water softener system having two softeners that can operate in parallel or in series in either order in accordance with the present invention.

FIG. 1 shows a diagrammatic flow sheet of a water softener system 10 having two softeners 20, 30 that can operate in parallel or in series in either order in accordance with one aspect of the present invention. The system 10 has two softeners 20, 30, which are conventional resin bed ion exchange softeners. Feedline 12 receives the raw feedwater. For parallel operation, valves 22, 26, 32 and 36 are open, and the rest are closed. The raw feedwater is thus provided to the inlet 21 of softener 20 via valve 22 and to the inlet 31 of softener 30 via valve 32. The effluent of each softener 20, 30 flows to the system exit line 14 via the respective outlets 23, 33 and valves 26 and 36, respectively. This parallel mode of operation is useful for high throughput situations.

For serial operation with softener 20 as worker and softener 30 as polisher, valves 22, 28, 34 and 36 are opened, and the rest are closed. The raw feedwater is thus provided via valve 22 to the inlet 21 of softener 20. The effluent of softener 20 is then provided via valve 28 to the switchback line 50 and via valve 34 to the inlet 31 of softener 30. The effluent of softener 30 is then output to the exit line 14 via valve 36.

For serial operation with softener 30 as worker and softener 20 as polisher, valves 32, 38, 24 and 26 are opened, and the rest are closed. The raw feedwater is thus provided via valve 32 to the inlet 31 of softener 30. The effluent of softener 30 is then provided via valve 38 to the switchback line 50 and via valve 24 to the inlet 21 of softener 20. The effluent of softener 20 is then output to the exit line 14 via valve 26.

For conventional alternating mode operation, only one softener is placed in service while the other is offline. For example, to place softener 20 in service and have softener 30 offline, valves 22 and 26 are open and all other valves are closed. To place softener 30 in service and have softener 20 offline, valves 32 and 36 are opened and all others are closed.

To regenerate softener 20, it is first taken offline by closing valves 22, 24, 28 and 26. Then, valves 44 and 48 are opened to admit the regenerating solution from the brine reservoir 40. A brine injector 42 is a type of jet pump that uses the force of incoming raw water to draw the brine from the reservoir 40 and into the feed stream provided to softener 20. The spent brine exits through valve 48 where it is disposed of or recycled.

To regenerate softener 30, it is first taken offline by closing valves 32, 34, 38 and 36. Then, valves 46 and 49 are opened to admit the regenerating solution from the brine reservoir 40. The spent brine then exits through valve 49 where it is disposed of or recycled. The need for regeneration may be determined based on a schedule, such as based on measured usage or time, or it may be determined based on appropriate sensor readings indicating hardness leakage. The regeneration cycles for each softener 20, 30 may include additional conventional steps, such as an initial backwash cycle and a rinse cycle, as is known in the art.

A system controller (not shown in FIG. 1), such as a microcontroller or PLC, is coupled to and controls the operation of each of the valves to change the operating modes of the system. As noted above, operating the softeners in parallel allows for maximum throughput, so this parallel mode is appropriate for addressing temporary, high water demand situations. Operating the softeners in series in worker/polisher mode allows for better performance and higher efficiency. For example, most industrial and commercial water softeners operating in alternating mode (i.e. one at a time) are regenerated at 15 pounds of salt per cubic foot of resin; this gives higher quality of water than lower salting rates, but it is not as efficient. A worker/polisher arrangement can utilize about a 40% lower salting rate, while still reducing hardness leakage. A lower salting rate is more efficient because it involves less salt and water usage during regeneration. A worker/polisher arrangement also provides redundancy in that, if one tank fails to regenerate properly, the other tank would still soften the water. Accordingly, the system may operate in worker/polisher mode most of the time, except when high demand necessitates parallel mode, during regeneration, or when operating in conventional alternating mode.

When operating in worker/polisher mode, whichever softener is the lead softener (i.e. the worker) will encounter the hardest water and bear the brunt of the softening load. Thus, at predetermined intervals, the worker is taken off-line and subject to a regeneration cycle. Then, after regeneration, the regenerated softener is placed back in service as the polisher. For example, a typical routine would be as follows. Valves 22, 28, 34 and 36 are open such that softener 20 is worker and softener 30 is polisher, i.e. the feedwater flows through softener 20 and then softener 30. Then valve 32 is opened to place softener 30 into the lead position, and softener 20 is taken offline by closing valves 22 and 28, and valve 34 is also closed. During this time, softener 30 is the sole softener online. Softener 20 is then regenerated with the brine solution. After being regenerated, softener 20 is brought into a polisher position by closing valve 36 and opening valves 38, 24, and 26. The system then operates with softener 30 as worker and softener 20 as polisher, with the water flowing through softener 30 and then softener 20. A similar process is used when softener 30 needs to be regenerated.

Figure 2:
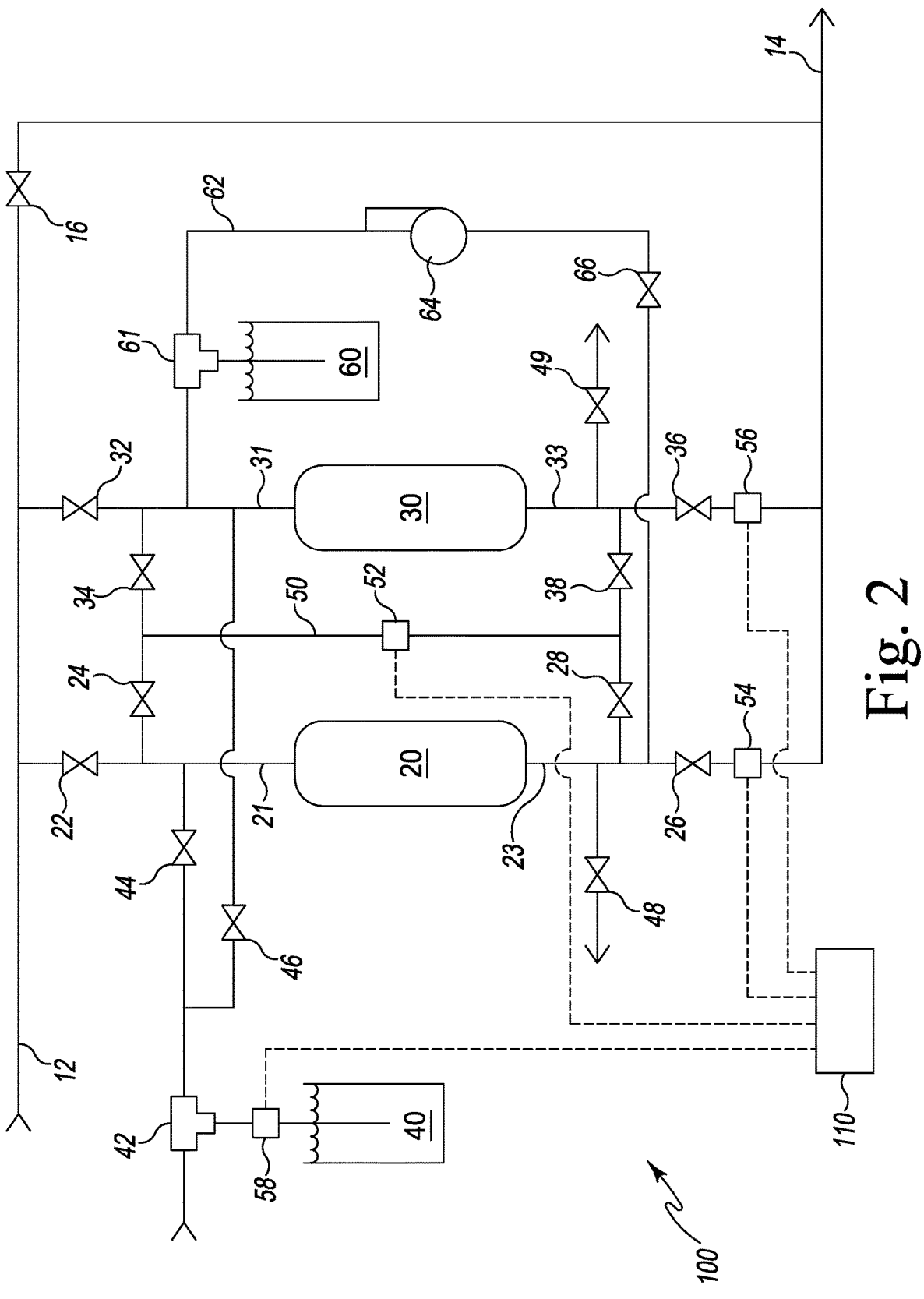
FIG. 2 is a diagrammatic flow sheet of the FIG. 1 system supplemented with a sanitizer recirculation loop and various sensors illustrating other aspects of the present invention.

FIG. 2 shows a diagrammatic flow sheet of another softener system 100 illustrating additional aspects of the invention. System 100 includes the same elements and general configuration as system 10, which elements are shown by like reference numbers.

Shown in FIG. 2 is system controller 110. As noted above, controller 110 is coupled to and controls all of the valves so as to transition the system between its various operating modes. Controller 110 is coupled to flow meters 52, 54 and 56 and to a hardness monitor 52. Flow meters 554 and 56 measure the outflow from the system. Controller uses this flow rate information to calculate usage so as to schedule the appropriate transitions between different operating modes, and regenerations schedules.

A hardness monitor 52, such as the Hach SP510, is provided on the common switchback line 50 that carries the effluent from the worker to the polisher. The hardness monitor 52 measures the hardness of the water and provides an alarm to notify if hard water is detected. By locating this monitor between the worker and the polisher, the system can more readily detect when the worker starts to leak hardness. When the units are operating in series, the controller may use the hardness readings from monitor 52 to determine when the worker needs to be taken out of service and subject to regeneration.

Flow meter 58 is provided on the draw line for the regeneration solution. This flow meter 58 measures the actual flow of the regeneration solution being drawn from the brine tank 40 by the jet injector 42 over time during a regeneration cycle. For a successful regeneration to take place, it is necessary for a highly concentrated salt solution to be delivered to the softener bed. The brine tank contains a super concentrated solution, but the brine solution is naturally diluted as it is mixed with the inlet water in the jet injector 42. The slower the uptake of the brine into the jet injector, the more diluted it becomes. If the upflow from the brine tank into the jet injector is too slow, the brine solution that is delivered to the softener can be too diluted to achieve full regeneration. Thus, when the actual rate of upflow of brine solution over time, as measured by flow meter 58, is below a predetermined threshold, the controller generates a warning of regeneration failure.

System 100 further includes a sanitizer recirculation loop 62. This loop connects above the inlet 31 of softener 30 and to the outlet 23 of softener 20 and is used to circulate a sanitizing solution through the softener beds before initial startup or periodically, for pathogen control. The recirculation loop 62 includes a sanitizer supply 60, an injector 61, a valve 66, and a pump 64 that serves to circulate the sanitizer through the softeners. During sanitizer circulation, both softeners are taken offline, and the system bypass valve 16 is open. Alternatively, separate sanitizer loops may be provided for each softener.

Any of the suitable technologies set forth and incorporated herein may be used to implement various example aspects of the invention as would be apparent to one of skill in the art. The softener tanks can be constructed of carbon steel and epoxy coated, stainless steel or fiberglass reinforced plastic (FRP). The tanks may include internal distribution systems constructed of schedule 80 PVC or stainless steel. Although exemplary embodiments and applications of the invention have been described herein including as described above and shown in the included example Figures, there is no intention that the invention be limited to these exemplary embodiments and applications or to the manner in which the exemplary embodiments and applications operate or are described herein. Indeed, many variations and modifications to the exemplary embodiments are possible as would be apparent to a person of ordinary skill in the art. The invention may include any device, structure, method, or functionality, as long as the resulting device, system or method falls within the scope of one of the claims that are allowed by the patent office based on this or any related patent application.

While the invention has been illustrated and described in detail in the drawings and foregoing description, the same is to be considered as illustrative and not restrictive in character. Only certain embodiments have been shown and described, and all changes, equivalents, and modifications that come within the spirit of the invention described herein are desired to be protected. Thus, the specifics of this description and the attached drawings should not be interpreted to limit the scope of this invention to the specifics thereof. Rather, the scope of this invention should be evaluated with reference to the claims appended hereto.

In reading the claims it is intended that when words such as "a", "an", "at least one", and "at least a portion" are used there is no intention to limit the claims to only one item unless specifically stated to the contrary in the claims. Further, when the language "at least a portion" and/or "a portion" is used, the claims may include a portion and/or the entire items unless specifically stated to the contrary. Likewise, where the term "input" is used in connection with a device or system component, such as a fluid processing unit or electrical device, it should be understood to comprehend singular or plural and one or more signal channels or fluid lines as appropriate in the context. Finally, all publications, patents, and patent applications cited in this specification are herein incorporated by reference to the extent not inconsistent with the present disclosure as if each were specifically and individually indicated to be incorporated by reference and set forth in its entirety herein.

What is claimed is:

1. A method for operating a water softening system having first and second resin bed ion exchange water softeners; comprising
   a. softening water in a first softening mode by directing feedwater from a supply line through the first ion exchange water softener and then through the second ion exchange water softener and then to a downstream user of softened water through a system exit line; and
   b. softening the water in a second softening mode by directing the feedwater from the supply line through the second ion exchange water softener and then through the first ion exchange water softener and then to the downstream user through the system exit line;
   c. regenerating a resin bed of the first ion exchange water softener with a brine solution after (a) and before (b).

2. The method of claim 1 further comprising softening the water in a third softening mode by directing the water from the supply line through the first and second ion exchange softeners in parallel fashion and then to a downstream user of softened water through the system exit line.

3. The method of claim 1 further comprising regenerating a resin bed of the second ion exchange water softener with a brine solution after (b).

4. The method of claim 1 further comprising detecting a potential regeneration failure by monitoring an amount of brine solution drawn from a brine tank during regeneration and generating an error message when the amount drawn in a predetermined time falls below a predetermined level.

5. The method of claim 1 further comprising sanitizing one or more of the softeners by circulating a sanitizing solution through the ion exchange bed of the softener being sanitized using a recirculation loop and recirculation pump.

6. The method of claim 1 wherein during (a) water from an outlet of the first ion exchange water softener is provided to an inlet to the second ion exchange water softener via a switchback line.

7. The method of claim 1 wherein during (b) water from an outlet of the second ion exchange water softener is provided to an inlet to the first ion exchange water softener via a switchback line.

8. The method of claim 1 further comprising operating one or more valves on one or more switchback lines with a controller after (a) and before (b) to change the flow of water through the system.

* * * * *